2,966,518
PROCESS OF PRODUCING NITROGEN-CONTAINING CHEMICAL COMPOUNDS

David Aaron Johnson, Syracuse, N.Y., assignor, by mesne assignments, to Bristol-Myers Company, New York, N.Y., a corporation of Delaware No Drawing. Filed July 22, 1957, Ser. No. 673,180

1 Claim. (Cl. 260—570.7)

This invention relates to a new process of producing chemical compounds and, more particularly, to the alkylation of phenols to produce ethers by the use of the sulfuric acid esters of N,N-disubstituted-aminoalcohols.

In the past such compounds have been made by processes utilizing such compounds as dialkylaminoalkyl halides but these compounds are unstable on storage, can not be stored in their active form and must be stored as acid addition salts, e.g. hydrochlorides, and liberated by a separate reaction before use, are highly corrosive, tend to polymerize and thus reduce yields and give undesirable rearrangements in some cases, e.g. β-dialkyl-amino-n-propyl chloride during alkylation gives both the n-propyl and the iso-propyl derivative.

It is the object of the present invention to provide processes of alkylation which avoid the disadvantages of the use of dialkylaminoalkyl halides.

These objectives have been achieved by the provision, according to the present invention, of the process of basically alkylating a metallic salt (preferably an alkali metal salt) of a phenol which comprises reacting said phenolate in an inert solvent with about one equivalent of a reagent having the formula B—alk—O—SO$_3$—M wherein B represents a member selected from the group consisting of di(lower)alkylamino, pyrrolidino, piperidino, pipecolino, morpholino and thiomorpholino and "alk" represents a bivalent, saturated hydrocarbon radical containing from two to six carbon atoms inclusive and M represents one equivalent of a metal, and preferably one atom of an alkali metal, to produce a basic phenolic ether in which the metallic atom of said phenolate has been replaced by the group "B—alk—."

Set forth in another manner, there is provided a process of producing a basic phenolic ether which comprises reacting a metal salt, and preferably an alkali metal salt, of a phenol having the formula

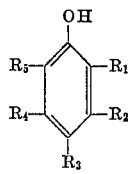

wherein R$_1$, R$_2$, R$_3$, R$_4$ and R$_5$ are members selected from the group consisting of hydrogen, (lower)alkyl, cycloalkyl, aryl, substituted aryl, aralkyl, substituted aralkyl, chloro, bromo, iodo, fluoro, (lower)alkoxy, aryloxy, aralkyloxy, cycloalkoxy, thioalkyl, thioaryl, nitro, thenyl, thienyl, 2-pyridyl, 3-pyridyl, 4-pyridyl, cyano, carboxamido, N-substituted-carboxamido, N,N-disubstituted-carboxamido, carbalkoxy and acyl and two adjacent R groups may be taken together to form a ring in an inert solvent with about one equivalent of a reagent having the formula B—alk—O—SO$_3$—M wherein B represents a member selected from the group consisting of di(lower)alkylamino, pyrrolidino, piperidino, pipecolino, morpholino and thiomorpholino and "alk" represents a bivalent, saturated hydrocarbon radical containing from two to six carbon atoms inclusive and M represents one equivalent of a metal, and preferably an atom of an alkali metal, to produce an ether having the formula

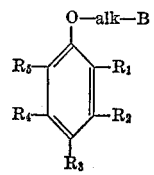

Certain embodiments of the processes of the present invention are illustrated by the following equations in which A represents (CH$_3$)$_2$NCH$_2$CH$_2$OSO$_3$Na, thus:

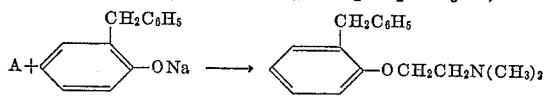

The aminoalcohols whose sulfuric acid monoesters (or their salts) are used in the present invention include alcohols having the formula B—alk—OH where B represents di(lower)alkylamino, pyrrolidino, piperidino, pipecolino, morpholino and thiomorpholino, and "alk" represents a bivalent, saturated hydrocarbon radical containing from two to six carbon atoms inclusive. These bases are referred to for simplicity as tertiary-aminoalcohols. The sulfuric acid monoesters of these bases are prepared according to Reeves and Guthrie, J. Amer. Chem. Soc. 75, 4101-2, 1953, or U.S. Patents 2,264,759 and 2,558,273 or references therein, or in the manner illustrated below.

*Preparation of 2-sulfatoethyldimethylamine*

(a) Liquid sulfur trioxide (16 g.) in about 100 ml. ethylene dichloride was added dropwise over about 30 minutes to 17.8 g. (0.2 mole) 2-hydroxyethyldimethylamine [(CH$_3$)$_2$NCH$_2$CH$_2$OH] dissolved in about 250 ml. ethylene dichloride and held at 0° C. The temperature rose to about 10° C. during this addition and reaction. The product, 2-sulfatoethyldimethylamine, settled out as an oil which soon solidified into a hard mass which changed to a gummy, syrupy liquid on completion of the addition of SO$_3$ and warming of the reaction to 20° C. The ethylene dichloride was decanted and the syrupy product was dissolved in hot methanol and the solution then cooled to precipitate 7.2 g. 2-sulfatoethyldimethylamine as a crystalline product which was collected by filtration.

An additional 8.3 g. product as the sodium salt was precipitated as a white amorphous solid by adjusting the pH of the filtrate to about pH 8 by the addition of sodium hydroxide. The combined yield was 43%.

(b) Sulfuric acid (200 mls., about 3.5 moles) was dropped slowly into 89 ml. (1.0 mole) of dimethylaminoethanol. The temperature was kept at 0°–10° C. by external cooling. Cold butanol (500 ml.) was then added with cooling to precipitate 26 g. white crystalline 2-sulfatoethyldimethylamine.

(c) Concentrated sulfuric acid (193 mls., 3 equivalents) was cooled and stirred; to this solution there was then added dropwise, at a rate which did not allow the temperature of the mixture to rise above room temperature, 100 g. (114 mls.) dimethylaminoethanol. At the end of the addition the mixture was poured into one liter of dry butanol. After standing overnight, the solid 2-sulfatoethyldimethylamine was collected by filtration, dried (86.9 g.) and dissolved by boiling in a mixture of 1.0 liter methanol and 50 ml. water. After filtering while hot, the filtrate was cooled to precipitate recrystallized product which was collected by filtration and dried (74.2 g.).

*Preparation of 2-sulfatoethyldiethylamine*

Diethylaminoethanol (100 g., 114 mls.) was added dropwise with stirring while cooling to room temperature or below to 250 g. (141 ml.) of 96% sulfuric acid. The mixture was then poured into a mixture of butanol (2.0 l.) water (100 ml.) and 50% aqueous sodium hydroxide (224 ml.). The sodium sulfate which precipitated was removed by filtration. The filtrate was concentrated by distillation in vacuo to a volume of one liter and cooled, precipitating 54 g. of the product, sodium 2-sulfatoethyldiethylamine.

It is apparent that these reagents can be prepared as free acids or as salts of metals such as sodium, potassium, calcium, magnesium, lithium and aluminum.

There has not been available in the past any practical method for the isolation of these sulfuric acid monoesters tertiary-aminoalcohols as solids in suitable form for industrial use and handling. I have provided such a process, exemplified above, by extracting these compounds into a primary, secondary or tertiary aliphatic alcohol containing 4, 5, 6 or 7 carbon atoms. I prefer to use n-butanol, sec. butyl alcohol or sec. aryl alcohol. The product, particularly where converted to the sodium salt, is extracted into the alcohol and simply recovered therefrom as an easily handled solid by simply removing a major portion of the alcohol by distillation in vacuo and then collecting the precipitated product. This is frequently found to be a hydrate which is used as such for alkylation, e.g. of phenols, except where small amounts of water are deleterious, e.g. to sodio derivatives of active methylene compounds; in that case the product is simply dried, as by heating in vacuo.

To prepare ethers, use is made of a phenol such as those disclosed in U.S. Patent 2,703,324 or on pages 936 through 944 of Handbook of Chemistry and Physics, 27th edition, Chemical Rubber Publishing Co., Cleveland, Ohio. The only essential requirement is that there be present a free phenolic group and no other interfering reactive group, e.g. no carboxyl group. To put it another way, use may be made of any phenol which is known to be converted to a basic ether by reaction (per se or as the salt of a metal such as sodium) with a dialkylaminoalkyl halide. There is no limitation to monocyclic phenols; use may be made of such compounds as α-naphthol, β-naphthol, 8-hydroxyquinoline and similar compounds bearing additional ring substituents.

In any case where the reaction is with a sodium salt of a phenol, the alkylating agent is used in the form of a metal salt, preferably sodium; this salt may be prepared in advance or in situ by the addition of alkali to the sulfuric acid mono-ester. Otherwise, of course, the hydrogen from the sulfuric acid mono-ester would merely replace the sodium atoms and convert the phenol or the like to its original form. In that case, the desired reaction proceeds slowly if at all.

For convenience, the process of the present invention is usually carried out in one of the typical inert organic solvents, e.g. benzene, toluene. On occasion, a water-insoluble solvent is used to facilitate removal of by-products such as sodium sulfate but this is not essential. As usual, heating speeds up the reaction but does no harm; the process is therefore often carried out under reflux. Most of the products of this process are tertiary amines in essential neutral solutions and are thus isolated as such by distillation or after conversion to acid addition salts in the usual manner.

The products of the process of the present invention are useful per se or after further known chemical transformations in many ways, e.g. as antihistaminic, antispasmodic, analgesic or anti-gastric secretory agents, and many have found wide therapeutic use, e.g. phenyltoloxamine.

Among the non-reactive substituents which may be present without harm in the phenols used in the processes of the present invention are chloro, bromo, iodo, fluoro, (lower)alkoxy (e.g. methoxy, ethoxy), aryloxy (e.g. phenoxy), aralkyloxy (e.g. benzyloxy), cycloalkyloxy (e.g. cyclohexyloxy, cyclopentyloxy), aralkyl (e.g. benzyl), substituted aralkyl (e.g. chlorobenzyl, ethylbenzyl, methoxybenzyl), aryl (e.g. phenyl, naphthyl per se or substituted with additional nonreactive groups as in tolyl, chlorophenyl, methoxyphenyl, cyanophenyl, nitrophenyl), nitro and cycloalkyl (e.g. cyclohexyl, cyclopentyl) groups, aromatic or partially aromatic groups (e.g. 2-, 3- or 4-pyridyl, thenyl thienyl, pyrrolyl), thioalkyl and thioaryl groups (e.g. thiomethy, thiophenyl) and cyano, carboxamido, N-substituted and N,N-disubstituted carboxamido, and carbalkoxy (e.g. carbethoxy) groups and non-enolic R—CO— where R is alkyl, cycloalkyl or aryl (e.g. acetyl, phenylacetyl, benzoyl, cyclohexylacetyl) which are herein called acyl. In other words, the only interfering groups are those bearing active hydrogens, i.e. those replaceable by metallic sodium.

Additional information is given by the following examples, which are for purposes of illustration only and not of limitation.

EXAMPLE 1

Sodium ortho-benzylphenol (50 g.) suspended in about 1.0 liter toluene was warmed; then 50 g. solid 2-sulfatoethyldimethylamine was added. The suspended matter dissolved. Flake sodium hydroxide (12 g.) was then added and the solution was heated to reflux for six hours. Sodium sulfate precipitated. After cooling and washing with one-quarter volume water, the toluene phase was separated and the toluene was removed by distillation. Dimethylaminoethyl o-benzylphenyl ether (95 g.) was then distilled at 153°–170° C. and 4 mm. pressure and added to a solution of 71.5 g. citric acid in 750 ml. methanol cooled to 5° C. to precipitate the product, dimethylaminoethyl o-benzylphenyl ether dihydrogen citrate. After stirring two hours, the product was collected by filtration, slurried in 250 ml. methanol, dried and found to melt at 138°–141° C. and to weigh 90.5 g. (83% yield based on weight of the phenol).

EXAMPLE 2

Distilled ortho-benzylphenol (32.8 g., 0.18 mole) was dissolved in a mixture of toluene (750 ml.) and sodium hydroxide (7.1 g., 0.18 mole) and refluxed for five hours. After the addition of 40 g. (0.21 mole) sodium 2-sulfatoethyldimethylamine, the mixture was refluxed for six hours, washed with ¼ volume water and distilled to give 35.9 g. dimethylaminoethyl 2-benzylphenyl ether, B.P. 165°–172° C./4–6 mm. This base was then dissolved in a solution of 27 g. citric acid in 284 ml. methanol; upon standing overnight dimethylaminoethyl 2-benzylphenyl ether dihydrogen citrate precipitated and was collected by filtration, dried and found to weigh 48.7 g. (61% yield based on o-benzylphenol).

EXAMPLE 3

Diphenylacetic acid (63.6 g.) was dissolved in 500 ml. toluene; after the addition of 12 g. flake sodium hydroxide the mixture was refluxed for 3 hours. Then 65.4 g. of sodium 2-sulfatoethyldimethylamine was added and the mixture was refluxed one hour, becoming thick. After the addition of 200 ml. toluene the mixture was refluxed overnight, cooled and washed with water. The toluene phase was dried over sodium sulfate, filtered and saturated with anhydrous hydrogen chloride to precipitate dimethylaminoethyl diphenylacetate hydrochloride which was dried and found to weigh 48 g. and to melt at 155°–160° C.

EXAMPLE 4

The procedure of the above examples is carried out without change except that the 2-sulfatoethyldimethylamine or its sodium salt is replaced by an equivalent weight of 2 - sulfatoethyldimethylamine, 2 - sulfatoethyldi-n-propylamine, N-(2-sulfatoethyl)morpholine, N - (2 - sulfatoethyl)pyrrolidine, N-(2-sulfatoethyl)piperidine, N-(2-sulfatoethyl)pipecoline, N - (2-sulfatoethyl)thiomorpholine, 2-sulfatopropyldimethylamine, 2-sulfato-n-hexyldimethylamine, 3-sulfatopropyldiethylamine, 5-sulfato-n-amyldimethylamine or their sodium salts respectively to give the corresponding basic ethers or esters.

I claim:

The process of preparing a basic phenolic ether which comprises forming a suspension of sodium orthobenzylphenol in an inert organic solvent selected from the group consisting of benzene and toluene, adding to said suspension about one equivalent of sodium 2-sulfatoethyldimethylamine, refluxing said mixture to form, as the reaction product, dimethylaminoethyl-o-benzylphenyl ether and recovering said reaction product.

References Cited in the file of this patent

UNITED STATES PATENTS

| 1,752,617 | Schulemann | Apr. 1, 1930 |
| 2,050,169 | Elbel | Aug. 4, 1936 |
| 2,103,017 | Putzer et al. | Dec. 21, 1937 |
| 2,553,093 | Jacob | May 15, 1951 |
| 2,582,292 | Sondern | Jan. 15, 1952 |
| 2,659,756 | Hafliger | Nov. 17, 1953 |
| 2,669,582 | Cusic | Feb. 16, 1954 |
| 2,698,867 | Mahan | Sept. 21, 1954 |
| 2,716,134 | Reynolds et al. | Aug. 23, 1955 |
| 2,738,349 | Galliot | Mar. 13, 1956 |
| 2,746,992 | Goldberg | May 22, 1956 |

FOREIGN PATENTS

| 203,708 | Australia | Oct. 20, 1955 |